United States Patent
Corniot

(10) Patent No.: US 7,706,930 B2
(45) Date of Patent: Apr. 27, 2010

(54) TIRE-INFLATION METHOD, AND DEVICE AND MACHINE FOR IMPLEMENTING THE METHOD

(75) Inventor: Philippe Corniot, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 903 days.

(21) Appl. No.: 10/582,081

(22) PCT Filed: Nov. 22, 2004

(86) PCT No.: PCT/FR2004/002969

§ 371 (c)(1),
(2), (4) Date: Sep. 6, 2006

(87) PCT Pub. No.: WO2005/066002

PCT Pub. Date: Jul. 21, 2005

(65) Prior Publication Data

US 2007/0113635 A1 May 24, 2007

(30) Foreign Application Priority Data

Dec. 8, 2003 (FR) .................................. 03 14330

(51) Int. Cl.
*B60C 23/02* (2006.01)

(52) U.S. Cl. .......................................... 701/1; 340/442

(58) Field of Classification Search ............... 701/1; 340/442, 444; 73/146.2, 146.8, 146.5; 152/415; 374/143; 116/34 R; 200/61.22

See application file for complete search history.

(56) References Cited

U.S. PATENT DOCUMENTS

| 4,574,267 | A | * | 3/1986 | Jones | ................. | 340/443 |
| 5,035,274 | A | | 7/1991 | Kinnick et al. | | |
| 5,335,540 | A | * | 8/1994 | Bowler et al. | ............ | 73/146.5 |
| 6,218,937 | B1 | | 4/2001 | Delaporte | | |
| 6,470,923 | B1 | * | 10/2002 | Gonzaga | .................. | 141/38 |
| 6,499,343 | B1 | | 12/2002 | Haas et al. | | |
| 6,880,394 | B2 | | 4/2005 | Boulot | | |
| 6,917,285 | B2 | | 7/2005 | Boulot | | |
| 7,079,047 | B2 | | 7/2006 | Boulot | | |
| 2003/0164758 | A1 | | 9/2003 | King et al. | | |

FOREIGN PATENT DOCUMENTS

EP 0 791 488 3/2003
WO WO 94/04398 3/1994

* cited by examiner

*Primary Examiner*—Dalena Tran
(74) *Attorney, Agent, or Firm*—Buchanan Ingersoll & Rooney PC

(57) ABSTRACT

The method consists in adjusting the pressure of a tire (5) according to a corrected set value $P_{cc}$ calculated using formula (I), wherein: $P_c$ is a set value recommended by a car manufacturer and a tire producer; $T_p$ is the temperature of the tire (5), supplied by a temperature sensor installed in the tire, and $T_{ref}$ is a variable reference temperature which is selected as being the lowest temperature from the instantaneous ambient temperature measured (at 37) at the site of the inflating machine (2) and a calculated mean value for ambient temperature, the pressures $P_c$ and $P_{cc}$ being in absolute value and temperatures $T_p$ and $T_{ref}$ being given in degrees K.

28 Claims, 2 Drawing Sheets

TIRE-INFLATION METHOD, AND DEVICE AND MACHINE FOR IMPLEMENTING THE METHOD

The present invention concerns a method for inflating a tyre on a vehicle wheel by means of an inflation machine controlled by a programmable data management unit, and a device and machine for implementing the method.

In order to obtain the best performance, which usually results from a compromise between wear, adhesion and comfort, and which determines good road holding, good braking, good suspension, a low running noise level, good vibration damping, etc, the vehicle/wheel/tyre unit must work at pressures having values very close to set pressure values recommended for tyre inflation. These set pressure values are generally fixed by agreement between the motor vehicle manufacturers and the tyre manufacturers in order to correspond to a given vehicle/wheel/tyre unit for given conditions of weight, speed and stability and for cold tyres, that is to say without heating due to running. Continuous running with underinflated tyres may result in a reduction in the performance of the tyres, such as resistance to running, endurance, comfort, etc. Conversely, overinflated tyres may result in degradation of adhesion of the tyres and comfort of the vehicle and to an acceleration in the wear on the tyres. As wrong inflation of the tyres may lead to not insignificant consequences, car manufactures and tyre manufacturers generally recommend that the pressure of the tyres be maintained within a narrow pressure range, generally less than 10% of the recommended set value, that is to say for a recommend set value of 2 bar, a maximum pressure difference of 200 millibars with respect to the said set value.

During an inflation operation using an inflation machine installed on a self-service basis in a petrol station or supermarket, drivers do not generally take account of the state of the tyres of the vehicle or, when they wish to take account of it, they encounter difficulties. This is because surveys have shown that:

drivers rarely adjust the pressure of the tyres on their vehicle when cold. Generally they travel several kilometers before stopping at an inflation station and do not known whether it is necessary to take account of heating of the tyres and, where applicable, to what proportion it should be taken into account.

Drivers may check pressures after or during a long journey.

Drivers cannot take account of temperature differences between tyres that have been exposed to the sun and tyres that have remained in the shade, and/or take account of differences in heating between tyres belonging to the front and rear axles.

During cold periods (Autumn, Winter and Spring) drivers adjust the pressures of the tyres on their vehicle rather at the middle or end of the day, and therefore at a time when the ambient temperature is usually higher than at the start of the day.

It often happens that drivers adjust the pressure of the tyres on their vehicle only once a year, when leaving for long holidays, generally in summer, and therefore at a period where the ambient temperature is relatively high.

In many cases, it therefore happens that the tyres are inflated at a time when the tyres are in a hot condition. In this case, if the tyre pressure is adjusted to the recommended set value by the motor vehicle manufacturer, the tyres may be underinflated. It may even happen that, if the tyres have been greatly heated, the driver notes that the pressure is higher than the set value recommended by the manufacturer and that, seeing this, the driver deflates the tyres whilst they were at the correct pressure or should have been reinflated if the pressure had been measured cold. In the latter case, the result may be that the tyres are or become appreciably underinflated without the driver knowing this, which may have many consequences, such as those indicated above.

When the drivers have recourse to a professional in a service station for inflating the tyres on their vehicle, usually the professional applies a radical solution consists of systematically inflating the tyres by adding 0.3 to 0.4 bar, or more, to the set value recommended by the manufacturer. Such a solution is also not satisfactory since it may lead to excessive inflation of the tyres and to degraded performance, in particular from the point of view of wear on the tyres and comfort of the vehicle.

Motor vehicles are known where the wheels are provided with a pressure monitoring system, usually referred to as a TPMS system (the abbreviation of the English expression Tyre Pressure Monitoring System, meaning system for monitoring the pressure of the tyres). TPMS systems in general comprise a pressure sensor and/or a pressure variation detector, and a management module able to receive and process information supplied by the pressure sensor and/or the pressure variation detector and a transmitting module for transmitting, to a receiver independent of the wheel, the information analysed and processed by the management module (see in particular the International Patent Applications published under the numbers WO 02/34551, WO 02/34552 and WO 02/34553). According to circumstances, the information transmitted to the receiver is used to warn the driver of a car of an abnormality, such as for example insufficient pressure inside the tyre cavity, a puncture, a rapid loss of pressure, a burst, etc.

Even with vehicles equipped with a TPMS system, correct inflation of the tyres is important. This is because the alarm triggering threshold with TPMS systems is usually not very far away from the set value recommended by the manufacturer for the inflation pressure, for example −300 to −400 millibars. As a result, if the driver readjusts the pressure of the tyres on his vehicle in the afternoon, for example after work, when the ambient temperature is approximately 20° C., and after having travelled a little, thus giving rise to a heating of the tyres by at least 10° C. in addition to the ambient temperature, that is to say in total a tyre temperature of at least 30° C., the next morning, when cold, if the ambient temperature is for example 0° C., the tyre pressure will easily have dropped by at least 300 millibars below the pressure adjusted by the driver during the inflation carried out in the afternoon on the previous day, that is to say the tyres may be at a pressure very close to the alarm triggering threshold. The alarm may therefore trigger and, if this occurs, the driver will readjust the pressure of the tyres according to his custom, usually in the afternoon after work, so that the same phenomenon may possibly reoccur the following morning and the following days without the driver understanding the phenomenon. The result with the driver is a certain incomprehension and/or weariness. On the other hand, if the driver has had the tyre pressure readjusted by a professional who has too greatly overinflated the tyres, the TPMS system does not necessarily emit an alarm, but this situation is also not satisfactory since it may cause the tyres to function outside the conditions for which they were provided.

The aim of the present invention is therefore to resolve the problems indicated above by providing a method for inflating a tyre on a vehicle wheel as correctly as possible even if the tyre is hot or has run over a long journey before its pressure is readjusted, and this whatever the time of day when the pressure readjustment is carried out.

To this end, the object of the present invention is a method for inflating a tyre on a vehicle wheel by means of an inflation machine controlled by a programmable data management unit, the said method consisting of:

a) using a wheel where at least one of the components of the wheel is provided with an information medium carrying a temperature sensor able to supply the value of the temperature of the tyre on the wheel, the said information medium being able to be consulted automatically and able to supply, when it is consulted, at least one data item that can be used for inflating the tyre, b) automatically consulting the said information medium and automatically transmitting to the said programmable data management unit at least the value of the temperature of the tyre supplied by the temperature sensor, c) supplying to the programmable data management unit at least one data item for defining a set value for the inflation pressure of the tyre, d) measuring the ambient temperature on the site of the inflation machine, e) calculating an average value of the said ambient temperature over a predefined elapsed time period, f) calculating, on the basis of the said set value for the inflation pressure, a corrected set value taking account of the value of the temperature of the tyre supplied by the temperature sensor, the corrected set value $P_{cc}$ being calculated according to the formula $$P_{cc} = P_c \cdot \frac{T_p}{T_{ref}}$$

in which $P_c$ is the said set value for the inflation pressure, $T_p$ is the temperature of tyre supplied by the temperature sensor and $T_{ref}$ is a variable reference temperature chosen as being the lowest temperature amongst the instantaneous ambient temperature measured on the site of the inflation machine and the said calculated average value of the ambient temperature, the pressures $P_c$ and $P_{cc}$ being in absolute value and the temperatures $T_p$ and $T_{ref}$ being in degrees K, g) measuring the value of the pressure of the air inside the tyre, h) adjusting, by inflation or deflation, the value of the pressure of the air inside the tyre to the calculated corrected set value.

In one embodiment of the present invention, the average value of the ambient temperature can be calculated over a period of 24 hours. As a variant, the average value of the ambient temperature can be calculated over a period of 12 hours.

Preferably, at step c), the said at least one data item for defining a set value for the inflation pressure is supplied automatically by the automatic consultation of the said information medium carried out at step b).

In a variant or for vehicles that are not equipped with a TPMS system, at step c) the said at least one data item for defining a set value for the inflation pressure is supplied by a user of the inflation machine by entering the said at least one data item by means of a keyboard.

The method according to the invention can also comprise a step consisting of measuring the atmospheric pressure on the site of the inflation machine, and at step f) the corrected set value $P'_{cc}$, in relative value is calculated according to the formula:

$$P'_{cc} = (P'_c + P_{atm}) \cdot [(t_p + 273)/(t_{ref} + 273)] - P_{atm}$$

in which $P'_c$ is the said set value, in relative value, for the inflation pressure, $P_{atm}$ is the value of the atmospheric pressure measured, and $T_p$ and $T_{ref}$ are the said temperature of the tyre and the said variable reference temperature in degrees C.

The method according to the invention can also comprise a step consisting of supplying to the programmable data management unit at least one additional item of information chosen from the group comprising information indicating the model of the vehicle fitted with the wheel whose tyre is to be inflated, information indicating whether the said tyre to be inflated belongs to a front or rear axle, information indicating a state of loading of the vehicle and information indicating on what type of road the user intends to travel, and the said at least one additional item of information is taken into account, in combination with the said data supplied at step c), to define the set value ($P_c$) for the inflation pressure to be used for calculating the corrected set value.

A method according to the invention can also comprise, after step h), the steps consisting of:

k) repeating step b), l) checking whether the temperature of the tyre supplied by the temperature sensor at step k) has changed by more than a predefined quantity with respect to the temperature of the tyre supplied by the temperature sensor at step b), m) if the result of the check carried at step l) is positive, repeating steps f) to h) using, in the formula for calculating the corrected set value, the value of the temperature of the tyre supplied by the temperature sensor at step k), otherwise sending an end of inflation message.

In one embodiment of the invention, at step g), the value of the pressure inside the tyre is measured by a first pressure sensor situated in the inflation machine.

Where the information medium carries a second pressure sensor able to supply the value of the pressure of the air inside the tyre, the method according to the invention can also have the following characteristics:

at step b), the value of the pressure supplied by the second pressure sensor is also transmitted to the programmable data management unit, at step g), the value of the pressure of the air inside the tyre measured by the first pressure sensor is compared with the value of the pressure supplied by the second pressure sensor and the error signal is produced and counted if the pressure values supplied by the first and second sensors differ by more than a predefined quantity.

In this case, an error message can be sent if the number of error signals counted reaches a predefined number during successive inflation operations, and the inflation machine is put out of service.

Another object of the present invention is a device for inflating a tyre on a vehicle wheel comprising:

a) at least one automatically consultable information medium carried by at least one of the components of the wheel whose tyre is to be inflated, the said information medium carrying a first temperature sensor able to supply the value of the temperature of the tyre on the wheel and being able to supply, when it is consulted, at least one data item that can be used for inflating the tyre, b) a consultation and transmission means able to automatically consult the said information medium and to automatically transmit the said at least one data item to a programmable data management unit, c) the said programmable data management unit, d) a second temperature sensor for measuring the ambient temperature on the site of the inflation machine, e) calculation means included in the said programmable data management unit for calculating a corrected set value for the inflation pressure of the tyre to be inflated, on the basis of a set value for the inflation pressure defined from at least one data item supplied to the said programmable data management unit, and taking account of the value of the temperature of the tyre supplied by the first temperature sensor, the programmable data management unit being programmed so that the said calculation means calculate an average value of the said ambient temperature over a predefined elapsed time period, and calculate the corrected set value $P_{cc}$ according to the formula:

$$P_{cc} = P_c \cdot \frac{T_p}{T_{ref}}$$

in which $P_c$ is the said set value for the inflation pressure, $T_p$ is the temperature of tyre supplied by the first temperature sensor and $T_{ref}$ is a variable reference temperature that is chosen as being the lowest temperature from amongst the instantaneous ambient temperature measured on the site of the inflation machine by the second temperature sensor and the said calculated average value of the ambient temperature, the pressures $P_c$ and $P_{cc}$ being in absolute value and the temperatures $T_p$ and $T_{ref}$ being in degrees K, f) at least one means for measuring the value of the pressure of the air inside the said tyre to be inflated and for supplying the value of the measured pressure to the said programmable data management unit, g) an inflation machine, controlled by the said programmable data management unit for adjusting the value of the pressure of the air inside the tyre to the correct set value ($P_{cc}$) calculated by the said calculation means.

In one embodiment of the invention the information medium comprises a memory containing, by way of the said at least one data item, the set value for the inflation pressure.

In another embodiment of the invention the information medium comprises a memory containing, by way of the said at least one data item, an identification data item relating to the tyre to be inflated.

In this case, the programmable data management unit comprises a memory containing a lookup table comprising the identification data of all the tyres liable to be inflated by means of the inflation machine and, for each identification data item, several set values for the inflation pressure that themselves depend on at least one supplementary item of information chosen from the group comprising information indicating the model of the vehicle to which the wheel whose tyre is to be inflated belongs, information indicating whether the said tyre belongs to a front or rear axle, information indicating a state of loading of the vehicle and information indicating on which type of road the user has the intention of travelling.

Preferably, a keyboard is provided for entering the said at least one supplementary item of information in the said programmable data management unit, and the latter is programmed to select, as the set value in the lookup table, the set value corresponding to the said identification data item and to the said at least one supplementary item of information entered by means of the keyboard.

In one embodiment of the invention, the device can comprise, by way of the said means for measuring the value of the pressure of the air inside the tyre, a first pressure sensor that is situated in the inflation machine and that is in communication, from the fluid point of view, with the said tyre when the inflation machine is connected to an inflation valve of the wheel.

In a variant or in addition to the previous characteristic, the device can comprise, by way of the said means for measuring the value of the pressure of the air inside the tyre, a second pressure sensor that is carried by the said information medium, and the said information medium is able, when it is consulted, to supply the value of the pressure measured by the second pressure sensor to the said programmable data management unit.

When the first and second pressure sensors are provided by way of means for measuring the value of the pressure of the air inside the tyre, the programmable data management unit can be programmed so as to compare the pressure values supplied by the first and second pressure sensors and to produce and count an error signal if the said pressure values differ by more than a predefined quantity.

In this case, the programmable data management unit can be programmed so as to send an error message if the number of error signals counted in the course of successive inflation operations reaches a predefined number and to put the inflation machine out of service.

The device according to the invention can also comprise a third pressure sensor installed so as to measure the atmospheric pressure on the site of the inflation machine, and the programmable data management unit is programmed so as to calculate the corrected set value $P'_{cc}$, in relative value according to the formula:

$$P'_{cc} = (P'_c + P_{atm}) \cdot [(t_p + 273)/(t_{ref} + 273)] - P_{atm}$$

in which $P'_c$ is the said set value, in relative value, for the inflation pressure, $P_{atm}$ is the value of the atmospheric pressure measured by the third pressure sensor (38), $T_p$ and $T_{ref}$ are respectively the said temperature of the tyre and the said variable reference temperature in degrees C.

Another object of the invention is an inflation machine for vehicle wheels having at least one component that is provided with an information medium carrying a first temperature sensor able to supply the value of the temperature of the tyre on the corresponding wheel, the said information medium being automatically consultable and able to supply, when it is consulted, at least one data item that can be used for inflating the tyre, the said machine comprising:

a) a consultation and transmission means able to automatically consult the said information medium and to automatically transmit the said at least one data item to a programmable data management unit, b) the said programmable data management unit, c) a second temperature sensor for measuring the ambient temperature on the site of the inflation machine, d) calculation means included in the said programmable data management unit for calculating a corrected set value for the inflation pressure of the tyre to be inflated, on the basis of a set value for the inflation pressure defined from at least one data item supplied to the said programmable data management unit, and taking account of the value of the temperature of the tyre supplied by the first temperature sensor, the programmable data management unit being programmed so that the said calculation means calculate an average value of the said ambient temperature over a predefined elapsed time period, and calculate the corrected set value $P_{cc}$ according to the formula:

$$P_{cc} = P_c \cdot \frac{T_p}{T_{ref}}$$

in which $P_c$ is the said set value for the inflation pressure, $T_p$ is the temperature of the tyre supplied by the first temperature sensor and $T_{ref}$ is a variable reference temperature that is chosen as being the lowest temperature from amongst the instantaneous ambient temperature measured on the site of the inflation machine by the second temperature sensor and the said calculated average value of the ambient temperature, the pressures $P_c$ and $P_{cc}$ being in absolute value and the temperatures $T_p$ and $T_{ref}$ being in degrees K, e) a pressure sensor able to measure the value of the pressure of the air inside the said tyre to be inflated and for supplying the value of the measured pressure to the said programmable data management unit, f) inflation means controlled by the said programmable data management unit for adjusting the value of the pressure of the air inside the tyre to the corrected set value calculated by the said calculation means.

The inflation means can also have one or more of the additional characteristics already indicated above with regards to the inflation device.

Other characteristics and advantages of the invention will emerge during the following description of an embodiment of the invention given by way of an example with reference to the accompanying drawings, in which.

Figure 1:
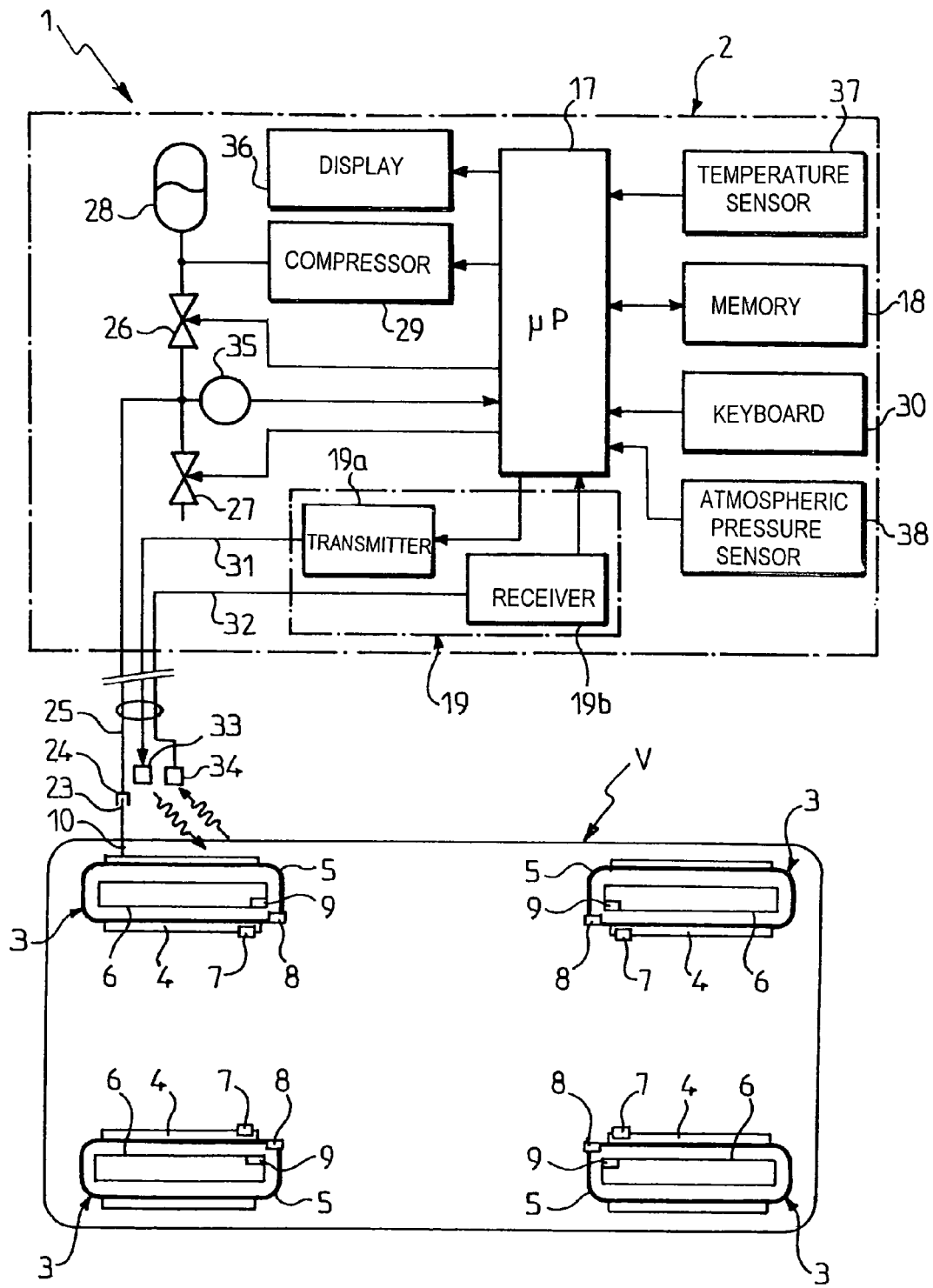
FIG. 1 illustrates a schematic representation of an inflation device according to one embodiment of the invention.

Referring first of all to FIG. 1, an inflation device 1 usable for implementing the method of the invention can been seen. The inflation device 1 comprises an inflation machine 2 able to inflate the wheels 3 of a motor vehicle V. Each wheel 3 comprises a rim 4, a tyre 5 and possibly a safety support 6 intended to allow temporary running of the vehicle V when there is a partial or total drop in pressure inside the cavity of the tyre 5 on the wheel.

Figure 2:
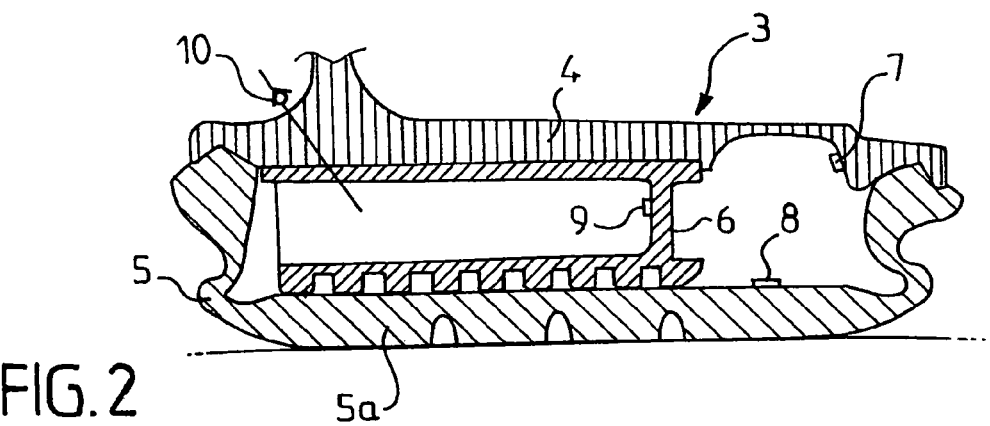
FIG. 2 is a view in transverse section showing part of a wheel, the components of which are provided with information media.

FIG. 2 illustrates, in transverse section, part of a wheel 3 of a known type, in a flat running state, that is to say in a deflated state of the tyre 5.

In the embodiment depicted here, each of the components 4, 5 and 6 of the wheel 3 comprises, in a manner known per se, an information medium 7, 8 or 9, respectively. However, here, at least one of the information media 7, 8 and 9 carries or contains at least one data item that can be used for inflating the wheel 3, in particular data for effecting a prior adjustment of the tyre inflation machine before an operation of inflating the wheel 3.

FIG. 2 shows a known example of installation of the information media 7, 8 and 9 in the wheel 3. In the example shown in FIG. 2, the information media 7, 8 and 9 are disposed against a wall of the corresponding component and held for example by adhesive bonding. For example, the information medium 8 associated with the tyre 5 is disposed against the internal face of the tread 5a of the tyre 5 and fixed to the tread by adhesive bonding. According to another example (not shown), the information media 7, 8 or 9 can be integrated or embedded, in a known fashion, in one or other of the walls of the corresponding component 4, 5 or 6. FIG. 2 also shows, very schematically, an inflation valve 10 in fluid communication with the internal cavity of the tyre 5.

The information media 7, 8 and 9 can take a multiplicity of forms, such as for example an electronic tag such as a transponder, a memory element of the ROM or RAM type, etc.

Figure 3:
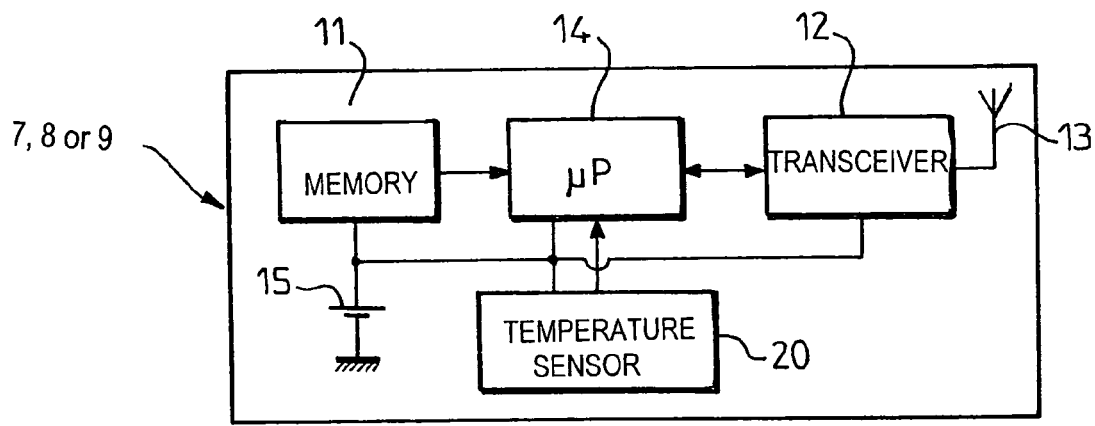
FIG. 3 illustrates a schematic representation of an information medium that can be used with any one of the components of the wheel shown in FIG. 2 and usable with the inflation device shown in FIG. 1.

FIG. 3 shows, schematically, an example of an electronic tag able to be used to form the information medium 7, 8 or 9. As shown in FIG. 3, the electronic tag comprises a memory 11 containing the data item or items that are to be transmitted to the inflation machine 2, a transceiver 12 able to establish, possibly via an antenna 13, a bi-directional wireless communication with the inflation machine 2, and a microprocessor 14 able to manage the functioning of the memory 11 and of the transmitting section of the transceiver 12 when the receiving section thereof receives an interrogation or stimulation signal coming from the inflation machine 2. A cell or battery 15 can be provided to supply the electrical energy necessary for the functioning of the memory 11, the transceiver 12 and the microprocessor 14. However, the presence of the battery is not absolutely necessary when use is made of a simple transponder and a fixed memory containing a single code since, in this case, the energy necessary for the functioning of the electronic tag can be taken from the interrogation or stimulation signal received by the electronic tag coming from the inflation machine 2.

At least one of the electronic tags 7, 8 and 9, for example the tag 7 associated with the rim 4 or the tag 8 associated with the tyre 5, comprises a temperature sensor 12 able to measure the temperature of the tyre. In the present context, temperature of the tyre means the temperature of the air in the cavity of the tyre 5. Preferably, a sensor with low current consumption, such as for example a thermocouple, is used as the temperature sensor 20, in order to economise on the energy of the cell or battery 15.

Figure 4:
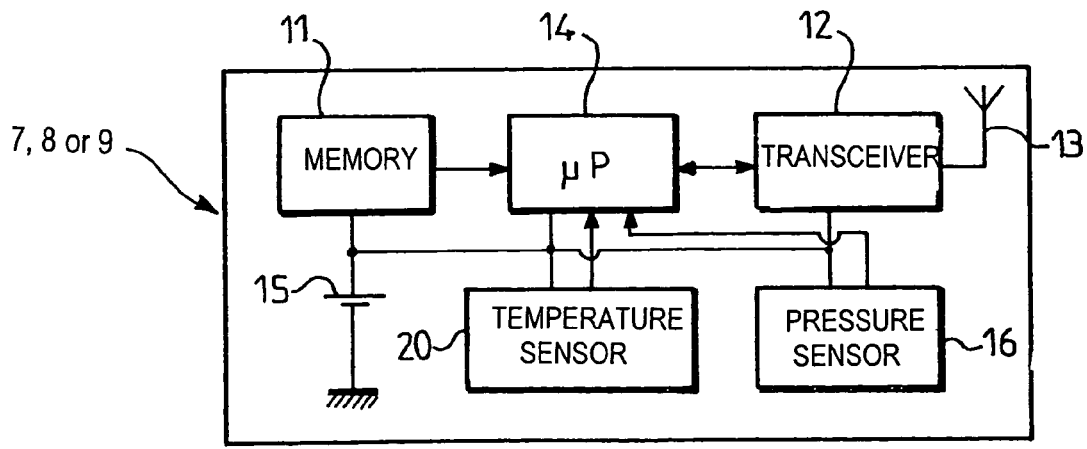
FIG. 4 is a view similar to FIG. 3, illustrating schematically a sophisticated information medium.

FIG. 4 shows, schematically, a more sophisticated electronic tag than the one in FIG. 3, which can also be used to form one or other of the information media 7, 8 or 9. The tag in FIG. 4 can be used in the case where it must also be capable of providing information on the value of the air pressure inside of the cavity of the tyre 5 on the wheel 3, such as for a vehicle equipped with a TPMS system. In the electronic tag in FIG. 4, the elements that are identical or that fulfil the same role as those of the electronic tag in FIG. 3 are designated by the same reference numbers and will not be described again in detail.

The electronic tag in FIG. 4 differs from that in FIG. 3 in that it also comprises a pressure sensor 16 able to measure the pressure of the air in the cavity of the tyre 5. In a known fashion, use is preferably made, as a pressure sensor 16, of a sensor not requiring any power supply, such as for example a sensor of the piezoelectric type, in order to economise on the cell or battery 15. This increases the life of the cell or battery 15 so that it can correspond, as far as possible, to that of the rim 4 or tyre 5 on the wheel 3. Thus, in addition to its function as an information medium for implementing the inflation method according to the invention, the electronic tag can also be used advantageously in the case where the vehicle is equipped with a TPMS system allowing the monitoring of the pressure in the tyres both when stopped and during running.

Returning to FIG. 1, it can be seen that the inflation machine 2 comprises a programmable data management unit 17, for example a microprocessor, and a memory 18, which may be an internal memory of the microprocessor 17 or an external memory connected to the microprocessor. The microprocessor 17 is designed, in a way that will be described in detail later, so as to adjust the inflation machine 2, before each tyre inflation operation, on the basis of data that are introduced into the memory 18 and that relate to the temperature of the tyre 5 on the wheel 3 to be inflated, to the type of the said tyre, to the model of the vehicle whose wheels are equipped with the said tyre, and possibly on the basis of other supplementary information, such as for example information indicating whether the tyre to be inflated belongs to a front or rear axle, or information relating to the current or future running conditions of the vehicle (state of loading of the vehicle, speed of the vehicle, that is to say changes in the vehicle in town, on the road or on the motorway). The microprocessor 17 is also designed so as then to manage, as will be seen later, the functioning of the functional components of the inflation machine 2 during the inflation operations, on the basis of a program stored in the memory 18.

At least some of the above mentioned data and/or information allowing the prior adjustment of the machine 2 with a view to adapting it to each wheel that is to be inflated can be entered manually by a user of the machine 2 by means of a keyboard 30, with a view to being entered in the memory 18.

However, given that, in the inflation method according to the invention, the machine 2 must be in a position to receive the information relating to the temperature of the tyre 5 to be inflated, a temperature that is measured by the temperature sensor carried [by] one of the electronic tags 7, 8 or 9 of the wheel 3, it is particularly advantageous for at least some of the above mentioned data necessary for the adjustment of the inflation machine 2, such as for example the type of tyre or the set value for the inflation pressure of this type of tyre, to be stored in the memory 11 of one or other of the electronic tags 7, 8 and 9, in order to be able to be transmitted to the inflation machine 2 in addition to the value of the temperature of the tyre 5 to be inflated.

The machine 2 therefore comprises, in addition to the above mentioned keyboard 30, at least one transceiver 19 that is connected to the microprocessor 17 by an appropriate link 21, for example a serial link of the RS232 type or a link of the CAN, BLUE TOOTH or other local network type. The transceiver 19 is designed so as to be able to establish a bi-directional wireless communication with the transceiver 12 of the electronic tag 7, 8 or 9 in FIG. 3 or 4.

For example, the transmitting section 19a of the transceiver 19 can be designed so as to send an interrogation or stimulation signal at a frequency of 125 kHz for a period of 2 to 3 seconds each time a machine 3 is brought close to the machine 2, as will be seen in detail below. When the receiving section of the transceiver 12 of the electronic tag 7, 8 or 9 receives the interrogation or stimulation signal transmitted by the transceiver 19, it excites the microprocessor 14, which seeks the data item or items contained in the memory 11 and transmits the said data, via the transmitting section of the transceiver 12 to the receiving section 19b of the transceiver 19, for example in the form of a coded signal at a frequency of 433 MHz or 315 MHz.

In the case where each of the components of the wheel 3 carries an electronic tag, that is to say in the case where the wheel 3 comprises several electronic tags such as the tags 7, 8 and 9, the coded response signal can be fixed on a particular frequency, close to 433 MHz or 315 MHz but different for each tag. At the machine 2, the transceiver 19 comprises a broadband receiving section 19b, able to receive all the frequencies liable to be transmitted by the electronic tags 7, 8 and 9. Even if only one of the components of the wheel 3 comprises an electronic tag, for example the rim 4 with its electronic tag 7, it may nevertheless be advantageous for the coded response signal to be fixed on a particular first frequency, for example greater than 433 MHz, for a wheel belonging to a front axle, and on a second particular frequency, for example less than 433 MHz, for a wheel belonging to a rear axle. In the latter case, the inflation machine 2 will be in a position to determine whether the tyre to be inflated belongs to a front or rear wheel simply by discriminating the frequency of the coded response signal.

Preferably, the interrogation or stimulation signal transmitted by the transmitting section of the transceiver 19 and the coded response signal or signals sent by the transmitting section of the transceiver 12 of the electronic tag or tags 7, 8 or 9 are synchronised, that is to say the coded response signals are transmitted in a time window of predefined duration after the transmission of the interrogation or stimulation signal. Thus the microprocessor 17 of the machine 2 is capable of rejecting any stray signal not received in the time window. The coded response signals received by the transceiver 19 and transmitted to the microprocessor 17 of the machine 2 are stored in the memory 18.

In FIG. 1, one of the wheels 3 of the vehicle V is shown with a valve 10 elongated in an exaggerated fashion for the convenience of the drawing. The valve 10 comprises a male coupling 23 connected to a female coupling 24 at one end of a flexible pipe 23 supplying compressed air coming from the inflation machine 2.

Inside the inflation machine 2, the other end of the flexible pipe 25 is connected firstly to the outlet of an inflation solenoid valve 26 and secondly to the inlet of a deflation solenoid valve 27 whose outlet is open to atmosphere. The inlet of the inflation solenoid valve 26 is itself connected firstly to a pressure accumulator 28 and secondly to the outlet of a compressor in a power compressor unit 29. A pressure sensor (not shown) whose output signal is sent to the microprocessor 17 can be associated with the pressure accumulator 27. In this case, a program contained in the memory 18 of the microprocessor 17 can be provided for comparing the value of the pressure in the pressure accumulator 28, measured by the above mentioned pressure sensor, with two threshold values, respectively lower and upper, in order to start up the power compressor unit 29 when the measured value of the pressure falls below the lower threshold value, and to stop the power compressor unit 29 when the measured value of the pressure reaches the upper threshold value.

By way of variant, in place of the above mentioned pressure sensor, it is possible to associate, with the pressure accumulator 28, a pressure switch with two pressure thresholds that starts up the powered compressor unit 29 when the pressure in the pressure accumulator 28 falls below a lower threshold value, and stops the said power compressor unit when the pressure in the accumulator 28 reaches an upper threshold value.

As indicated above, the memory 11 of the electronic tag associated with the rim 4 or with the tyre 5 can contain a data item for defining a set value for the inflation pressure of the tyre 5 on the corresponding wheel 3. This data item can be the set value itself. However, in the case where the memory 18 contains a lookup table, it is not absolutely essential for the memory 11 of the electronic tag 7 or 8 associated with the rim 4 or tyre 5 to contain a set value for the inflation pressure of the corresponding tyre. This is because in this case it suffices for the memory 11 to contain identification data, for example the type of tyre, and for the lookup table contained in the memory 11 to comprise, for each identification data item, a set value for the inflation pressure of the tyre 5 associated with a rim 4 that was identified by means of the identification data contained in the memory 11 of the corresponding electronic tag 7 or 8. The set values for the inflation pressure can, as indicated above, be the values defined or recommended by the car manufacturers, in agreement with the tyre manufacturers, for given vehicle/wheel/tyre combinations, for cold tyres, that is to say without heating due to running, and for giving running conditions, in particular the state of loading and the speed of the vehicle.

The transmitting section 19a and the receiving section 19b of the transceiver 19 of the inflation machine 2 are preferably connected respectively by flexible cables 31 and 32 to antennae 33 and 34 situated close to the female coupling 24 of the flexible pipe 25. The cables 31 and 32 can be connected to or integrated in the flexible pipe 25, at least in its part situated outside the inflation machine 2, in order to form only a single flexible elongate element with the said pipe. Under these conditions, using transceivers 12 and 19 with a short range, for example less than one meter, it can be ensured that the transceiver 19 of the inflation machine will receive only the data item or items contained in the tags 7, 8 and 9 of the components 4, 5 and 6 of the wheel 3 whose valve 10 is connected to the flexible pipe 25.

The inflation machine 2 can also comprise, in a conventional fashion, a pressure sensor 35 connected from the fluid point of view to the flexible pipe 25. The pressure sensor 35 is electrically connected to the microprocessor 17. When the flexible pipe 25 is connected to the valve 10 of a wheel 3, the pressure sensor 35 measures the actual value of the pressure of the internal cavity of the tyre 5 on the wheel 3 and supplies to the microprocessor 17 a signal indicating the said actual value of the pressure.

A display 36 is also preferably connected to the microprocessor 17, for example to display the actual value of the pressure measured by the pressure sensor 35 or by the pressure sensor 16 (FIG. 4) if the electronic tag 7 or 8 associated with the rim 4 or with the tyre 5 on the wheel 3 whose valve 10 is connected to the flexible pipe 25 comprises such a pressure sensor.

To allow the implementation of the inflation method according to the invention, the inflation machine 2 also comprises a temperature sensor 37 able to measure the ambient temperature on the site of the inflation machine. The temperature sensor 37 is connected electrically to the microprocessor 17 of the machine 2 and supplies to it a signal indicating the value of the ambient temperature on this site of the machine 2.

The microprocessor 17 is programmed so as to acquire, at regular intervals, for example every hour or every half hour, or even more frequently if so required, the value of the ambient temperature supplied by the temperature sensor 37.

In addition, the microprocessor 17 is programmed so as to calculate an average value of the ambient temperature measured by the temperature sensor 37 over a predefined elapsed period of time. For example, the microprocessor can continuously calculate the average value of the ambient temperature over the period of 12 hours or 24 hours preceding each acquisition of the value of the ambient temperature. By way of variant, the microprocessor 17 can be programmed to calculate the said average value of the ambient temperature, over the said period of 12 hours or 24 hours, every day at a fixed time, for example at midday and/or midnight. The value of the ambient temperature measured by the temperature sensor 37 and the average value of the ambient temperature calculated by the microprocessor are stored and periodically updated in the memory 18.

An inflation cycle can be initiated in various ways. For example, the program contained in the memory 18 of the microprocessor 17 can be designed so that, when the machine 2 is on standby, the microprocessor 17 excites the transceiver 19 at regular intervals, for example every 10 seconds, so that its transmitting section 19a transmits an interrogation or stimulation signal for two to three seconds. If at this time the flexible pipe 25 has already been connected to the valve 10 of a wheel 3 and the receiving section 19b of the transceiver 19 receives a coded response signal coming from the electronic tag 7, 8 or 9 on the said wheel 3 in a time window of predefined duration following the transmission of the interrogation or stimulation signal, an inflation cycle is initiated.

By way of variant, the transmitting section 19a of the transceiver 19 could be arranged so as to transmit the interrogation or stimulation signal to the electronic tags 7, 8 and 9 only in response to the reception by the microprocessor 17 of a pressure indication signal generated by the pressure sensor 35 when the flexible pipe 25 is connected to the valve 10 or, if the tyre 5 is completely deflated, in response to the pressing of a start button (not shown) by a user of the inflation machine 2.

In all cases, the initiation of an inflation operation commences with the operation of adjusting the inflation machine 2. This adjustment operation consists of loading into the memory 18 or into another working memory of the microprocessor 17 a set value for the inflation pressure of the tyre 5 on the wheel whose valve 10 is connected to the flexible pipe 25. As indicated previously, this set value can be obtained directly and automatically from the memory 11 of the electronic tag 7 or 8, or can be obtained from a lookup table contained in the memory 18, on the basis of identification data sent to the microprocessor 17 by the electronic tag 7 or 8. In addition, and/or by way of variant, the set value for the inflation pressure can be introduced manually into the memory 18 by the user of the inflation machine 2 by means of the keyboard 30. Such a manual entry for the set value for the inflation pressure may be made necessary for example when the information medium 7, 8 or 9 contained in the wheel of the vehicle does not have any memory 11 or when the memory 11 does not contain a set value for the pressure or a data item for defining the said set value.

At this stage, other information can also be supplied to the microprocessor 17, such as for example the information indicating whether the tyre belongs to a front wheel or to a rear wheel, the present or future state of loading of the vehicle, and the speed envisaged for the vehicle, that is to say information indicating whether the driver has the intention to drive in town, on the open road or on a motorway.

At least some of these data or supplementary information may be communicated automatically to the microprocessor 17. For example, the information concerning the front wheel or the rear wheel can be determined where applicable from the frequency of the coded response signal sent by the electronic tag 7 or 8. In a variant, this information can be supplied by transponders fixed at appropriate places on the vehicle V and able to react to the interrogation or stimulation signals transmitted by the transmitting section 19a of the transceiver 19.

The information indicating whether the vehicle is lightly loaded, moderately loaded or heavily loaded can also be supplied, via the above mentioned transponders, by load sensors or other strain gauges incorporated in the vehicle wheel suspensions. The speed information can also be supplied automatically to the microprocessor 17, via an appropriate transponder, in the case where the vehicle is equipped with an on-board computer that calculates, amongst other things, as is usual, the average speed of the vehicle during the current journey.

However, where necessary, in particular when it is a case of indicating to the inflation machine 2 what will be the future running conditions, the above mentioned data or information can also be introduced manually into the memory 18 of the microprocessor 17 by the user of the machine 2 by means of the keyboard 30. To this end, the keyboard 30 can comprise for example preprogrammed function keys, switches or selectors that, when they are activated or positioned according to the choice of the user, supply the required information to the microprocessor 17.

From the data and information thus introduced automatically or manually into the memory 18 of the microprocessor 17, the latter is in a position to determine, for example by means of a lookup table, the set value recommended for the inflation pressure corresponding to the front or rear wheel 3 whose inflation valve 10 is connected to the machine 2, and if necessary taking account of the state of loading and the current or projected speed for the vehicle.

The information medium 7 or 8 that carries the temperature sensor 20 also supplies to the microprocessor 17 the value of the temperature of the tyre 5 to be inflated. Next the microprocessor 17 calculates a corrected set value for the inflation pressure on the basis of the set value for the inflation pressure that was determined for the tyre 5 to be inflated, on the basis of the value of the temperature of the tyre 5 measured by the temperature sensor 20 and on the basis of the instantaneous ambient temperature measured by the temperature sensor 37 or on the basis of the average ambient temperature calculated as indicated above for the microprocessor 17. The latter calculates the said corrected set value $P_{cc}$ according to formula (1)

$$P_{cc} = P_c \cdot \frac{T_p}{T_{ref}}$$

in which $P_c$ is the set value of the pressure determined as described previously, $T_p$ is the temperature of the tyre 5 measured by the temperature sensor 20 and $T_{ref}$ is a variable reference temperature. This variable reference temperature $T_{ref}$ is chosen as being the lowest temperature from amongst the instantaneous ambient temperature measured by the temperature sensor 37 and the average value of the ambient temperature calculated by the microprocessor 17. In the above-indicated formula (1), the two temperatures $T_p$ and $T_{ref}$ are absolute temperatures expressed in degrees K (degrees Kelvin).

Once the corrected set value $P_{cc}$ for the inflation pressure of the wheel 3 has thus been calculated, it is stored in an appropriate memory of the microprocessor 17 and the program then initiates the inflation operation proper.

The microprocessor 17 commences by checking whether the actual value of the pressure in the cavity of the tyre 5, measured by the pressure sensor 35 (or possibly by the pressure sensor 16 if such is provided) is less than the corrected calculated set value $P_{cc}$ or whether it is greater than the said calculated corrected set value. If the tyre 5 is underinflated, the microprocessor 17 then, by means of a power control circuit (not shown), demands the opening of the solenoid valve 26 in order to inflate the tyre 5. The inflation operation continues until the time when the actual value of the pressure measured by the pressure sensor 35 (or 16) reaches the calculated corrected set value. At this moment, the microprocessor 17 causes the closure of the solenoid valve 26 and the transmission of an audible and/or light signal warning the user of the inflation machine 2 that the tyre inflation operation is terminated. The microprocessor can also cause the display of an "end of inflation" message on the screen of the display 36.

Conversely, if the tyre 5 is excessively inflated, the microprocessor 17 then, by means of another power control circuit (not shown), demands the opening of the solenoid valve 26 in order to deflate the tyre 5. The deflation operation continues until the time when the actual value of the pressure measured by the pressure sensor 35 (or 16) reaches the calculated corrected set value. At this moment, the microprocessor causes the closure of the solenoid valve 27 and the transmission of the above mentioned audible and/or light signal and/or the display of the "end of inflation" message.

If the tyre were very deflated, it may happen that it is necessary to inject a relatively large quantity of air into the tyre. In this case, if the temperature of the air injected into the tyre has a value substantially different from that of the air that was already in the tyre cavity, an appreciable change to the value of the temperature $T_p$ of the tyre may result therefrom.

Consequently, in a more sophisticated version of the inflation method according to the invention, the microprocessor 17 of the inflation machine can be programmed to interrogate once again, after the inflation operation described above, the information medium 7 or 8 that carries the temperature sensor 20, in order to acquire the new value of the temperature of the tyre after the first inflation operation. If the new value of the temperature $T_p$ has changed by more than a predefined quantity, for example by more than 5° C. above or below the value of the temperature initially acquired before the inflation operation, the program contained in the memory of the microprocessor 17 then instructs the latter to recalculate a new corrected set value, according to formula (1) indicated above, using the values previously determined or calculated for $P_c$ and for $T_{ref}$ and using the new value acquired for the temperature $T_p$. Next the microprocessor 17 controls the inflation machine 2 so as to inflate or deflate the tyre 5 in order to bring the actual pressure, measured by the pressure sensor 35 (or 16), to the new recalculated corrected set value.

In formula (1) indicated above, giving the value of the corrected set pressure, the two pressures $P_{cc}$ and $P_c$ are in absolute value and the temperatures $T_p$ and $T_{ref}$ are in degrees K. The above indicated formula (1) can then be written as the following formula (2):

$$P'_{cc} = (P'_c + P_{atm}) \cdot [(t_p + 273)/(t_{ref} + 273)] - P_{atm}$$

in which $P'_c$ and $P'_{cc}$ are respectively the set value and the corrected set value, expressed in relative value, $P_{atm}$ is the value of the atmospheric pressure, $T_p$ and $T_{ref}$ are the temperature of the tyre and the variable reference temperature expressed in degrees C.

It can therefore be seen that the value of the corrected set pressure $P'_{cc}$ depends on the atmospheric pressure. As atmospheric pressure can vary substantially not only on the same site but also from one site to another (the atmospheric pressure has a value that depends in particular on the altitude with respect to sea level), the inflation method according to the invention can be adapted to take account of the value of the atmospheric pressure prevailing on the inflation site.

In this case, as shown in FIG. 1, the machine 2 can also comprise an atmospheric pressure sensor or barometer 38 able to supply to the microprocessor 17 a signal indicating the value of the atmospheric pressure prevailing on the site of the inflation machine 2. The microprocessor 17 can then be programmed to calculate the corrected set value $P'_{cc}$ in relative value according to formula (2) indicated above. Naturally, in this case, the temperature sensors 20 and 37 must be calibrated in degrees C. or, if they are calibrated in degrees K, the microprocessor must be programmed to carry out the conversion from degrees K into degrees C. before carrying out the calculation according to formula (2).

It may happen that the pressure sensor 35 that supplies to the microprocessor 17 the actual value of the pressure of the air in the cavity of the tyre 5 may be defective, or this sensor 35 may supply a pressure value shifted upwards, as sometimes happens with the type of sensor (Bourdon tube) used in self-service inflation machines. Under these conditions, the tyres inflated with an inflation machine comprising a pressure sensor 35 giving pressure values shifted upwards will be systematically underinflated.

In order to prevent this, the microprocessor 17 can be programmed to carry out self-diagnosis when the wheel equipped with the tyre to be inflated comprises an information medium 7, 8 or 9 carrying a pressure sensor such as the pressure sensor 16 in FIG. 4. This is because this pressure sensor may be more precise than the sensor 35. In this case, the microprocessor 17, which receives firstly the value of the pressure measured by the sensor 35 and secondly the value of the pressure measured by the sensor 16, can be programmed to compare the two pressure values and to supply an error signal if the two values differ by more than a predefined quantity, for example by more than 50 millibars. Naturally this value is given purely by way of indication since it may be greater or smaller if so desired. The error signals thus produced by the microprocessor are counted in an appropriate counter during the inflation operations carried out by the inflation machine 2 and the content of the counter is compared on each occasion with a predefined number, for example four or a multiple of four, that is to say a multiple of the usual number of wheels on a car. Under these conditions, the microprocessor can be programmed to send an error message and to display this error message on the screen of the display 36 if the number of error signals counted reaches the predefined number, and to put the inflation machine 2 out of service.

Naturally the embodiments of the invention that were described above were given by way of purely indicative and in no way limiting examples and many modifications can easily be made by a person skilled in the art without for all that departing from the scope of the invention.

The invention claimed is:

1. Method for inflating a tyre (5) on a vehicle wheel (3) by means of an inflation machine (2) controlled by a programmable data management unit (17), the said method comprising the steps of:
   a) using a wheel (3) where at least one of the components (4, 5 and 6) of the wheel (3) is provided with an information medium (7, 8, 9) carrying a temperature sensor (20) able to supply a value of a temperature of the tyre (5) on the wheel, the said information medium (7, 8, 9) being able to be consulted automatically and able to supply, when it is consulted, at least one data item ($T_p$) that can be used for inflating the tyre,
   b) automatically consulting the said information medium (7, 8 or 9) and automatically transmitting to the said programmable data management unit (17) at least the value of the temperature ($T_p$) of the tyre supplied by the temperature sensor (20),
   c) supplying to the programmable data management unit (17) at least one data item for defining a set value ($P_c$) for the inflation pressure of the tyre (5),
   d) measuring an ambient temperature on the site of the inflation machine (2),
   e) calculating an average value of the said ambient temperature over a predefined elapsed time period,
   f) calculating, on the basis of the said set value ($P_c$) for the inflation pressure, a corrected set value ($P_{cc}$) taking account of the value of the temperature ($T_p$) of the tyre (5) supplied by the temperature sensor (20), the corrected set value $P_{cc}$ being calculated according to the formula $$P_{cc} = P_c \cdot \frac{T_p}{T_{ref}}$$

in which $P_c$ is the said set value for the inflation pressure, $T_p$ is the temperature of tyre (5) supplied by the temperature sensor (20) and $T_{ref}$ is a variable reference temperature chosen as being a lowest temperature amongst a ambient temperature measured on the site of the inflation machine (2) and the said calculated average value of the ambient temperature, the pressures $P_c$ and $P_{cc}$ being in absolute value and the temperatures $T_p$ and $T_{ref}$ being in degrees K,
   g) measuring a value of a pressure of the air inside the tyre (5),
   h) adjusting, by inflation or deflation, the value of the pressure of the air inside the tyre to the calculated corrected set value ($P_{cc}$).

2. Method according to claim 1, characterised by the fact that at step e) the average value of the ambient temperature is calculated over a period of 24 hours.

3. Method according to claim 1, characterised by the fact that at step e) the average value of the ambient temperature is calculated over a period of 12 hours.

4. Method according to any one of claims 1 to 3, characterised by the fact that at step c) the said at least one data item for defining a set value ($P_c$) for the inflation pressure is supplied automatically by the automatic consultation of the said information medium (7, 8 or 9) carried out at step b).

5. Method according to any one of claims 1 to 4, characterised by the fact that at step c) the said at least one data item for defining a set value ($P_c$) for the inflation pressure is supplied by a user of the inflation machine (2) by entering the said at least one data item by means of a keyboard (30).

6. Method according to any one of claims 1 to 5, also characterised by the step consisting of:
   i) measuring the atmospheric pressure on the site of the inflation machine (2),
   and by the fact that, at step f), the corrected set value $P'_{cc}$ in relative value is calculated according to the formula:

$$P'_{cc} = (P'_c + P_{atm}) \cdot [(t_p + 273)/(t_{ref} + 273)] - P_{atm}$$

in which $P'_c$ is the said set value, in relative value, for the inflation pressure, $P_{atm}$ is the value of the atmospheric pressure measured, $T_p$ and $T_{ref}$ are the said temperature of the tyre and the said variable reference temperature in degrees C.

7. Method according to any one of claims 1 to 6, also characterised by the step comprising:
   j) supplying to the programmable data management unit (17) at least one additional item of information chosen from the group comprising information indicating the model of the vehicle (V) fitted with the wheel (3) whose tyre (5) is to be inflated, information indicating whether the said tyre (5) to be inflated belongs to a front or rear axle, information indicating a state of loading of the vehicle (V) and information indicating on what type of road the user intends to travel,
   and by the fact that at least one additional item of information is taken into account, in combination with the said data supplied at step c), to define the set value ($P_c$) for the inflation pressure to be used for calculating the corrected set value ($P_{cc}$).

8. Method according to any one of claims 1 to 7, characterised by the fact that after step h) there are also provided the steps comprising:
- k) repeating step b),
- l) checking whether the temperature ($T_p$) of the tyre (5) supplied by the temperature sensor (20) at step k) has changed by more than a predefined quantity with respect to the temperature of the tyre supplied by the temperature sensor at step b),
- m) if the result of the check carried at step l) is positive, repeating steps f) to h) using, in the formula for calculating the corrected set value, the value of the temperature of the tyre supplied by the temperature sensor at step k), otherwise sending an end of inflation message.

9. Method according to any one of claims 1 to 8, characterised in that at step g) the value of the pressure inside the tyre (5) is measured by a first pressure sensor (35) situated in the inflation machine.

10. Method according to claim 9, in which the information medium (7, 8 or 9) carries a second pressure sensor (16) able to supply the value of the pressure of the air inside the tyre (5), characterised by the fact that
- at step b), the value of the pressure supplied by the second pressure sensor (16) is also transmitted to the programmable data management unit (17),
- at step g), the value of the pressure of the air inside the tyre (5) measured by the first pressure sensor (35) is compared with the value of the pressure supplied by the second pressure sensor (16) and the error signal is produced and counted if the pressure values supplied by the first and second sensors differ by more than a predefined quantity.

11. Method according to claim 10, characterised by the fact that an error message is sent if the number of error signals counted reaches a predefined number during successive inflation operations, and the inflation machine (3) is put out of service.

12. Device for inflating a tyre (5) on a vehicle wheel (3), comprising:
- a) at least one automatically consultable information medium (7, 8 or 9) carried by at least one of a components (4, 5 or 6) of the wheel (3) whose tyre (5) is to be inflated, the said information medium carrying a first temperature sensor (20) able to supply a value of a temperature of the tyre (5) on the wheel (3) and being able to supply, when it is consulted, at least one data item ($T_p$) that can be used for inflating the tyre (5),
- b) a consultation and transmission means (19) able to automatically consult the said information medium (7, 8 or 9) and to automatically transmit the said at least one data item to a programmable data management unit (17),
- c) the said programmable data management unit (17),
- d) a second temperature sensor (27) for measuring an ambient temperature on a site of an inflation machine (2),
- e) calculation means included in the said programmable data management unit (17) for calculating a corrected set value ($P_{cc}$) for an inflation pressure of the tyre (5) to be inflated, on the basis of a set value ($P_c$) for the inflation pressure defined from at least one data item supplied to the said programmable data management unit (17), and taking account of the value of the temperature ($T_p$) of the tyre supplied by a first temperature sensor (20), the programmable data management unit (17) being programmed so that the said calculation means calculate an average value of the said ambient temperature over a predefined elapsed time period, and calculate the corrected set value $P_{cc}$ according to the formula:

$$P_{cc} = P_c \cdot \frac{T_p}{T_{ref}}$$

in which $P_c$ is the said set value for the inflation pressure, $T_p$ is the temperature of the tyre (5) supplied by the first temperature sensor (20) and $T_{ref}$ is a variable reference temperature that is chosen as being a lowest temperature from amongst a ambient temperature measured on the site of the inflation machine (2) by a second temperature sensor (37) and the said calculated average value of the ambient temperature, the pressures $P_c$ and $P_{cc}$ being in absolute value and the temperatures $T_p$ and $T_{ref}$ being in degrees K,
- f) at least one means (35, 16) for measuring a value of a pressure of the air inside the said tyre (5) to be inflated and for supplying the value of the measured pressure to the said programmable data management unit (17),
- g) an inflation machine (2), controlled by the said programmable data management unit (17) for adjusting the value of the pressure of the air inside the tyre (5) to the correct set value ($P_{cc}$) calculated by the said calculation means.

13. Device according to claim 12, characterised by the fact that the information medium (7, 8 or 9) comprises a memory (11) containing, by way of the said at least one data item, the set value ($P_c$) for the inflation pressure.

14. Device according to claim 12, characterised by the fact that the information medium (7, 8 or 9) comprises a memory (11) containing, by way of the said at least one data item, an identification data item relating to the tyre (5) to be inflated.

15. Device according to claim 14, characterised by the fact that the programmable data management unit (17) comprises a memory (18) containing a lookup table comprising the identification data of all the tyres liable to be inflated by means of the inflation machine (2) and, for each identification data item, several set values for the inflation pressure that themselves depend on at least one supplementary item of information chosen from the group comprising information indicating the model of the vehicle (V) to which the wheel (3) whose tyre (5) is to be inflated belongs, information indicating whether the said tyre (5) belongs to a front or rear axle, information indicating a state of loading of the vehicle (V) and information indicating on which type of road the user has the intention of travelling.

16. Device according to claim 15, characterised by a keyboard (30) for entering the said at least one supplementary item of information in the said programmable data management unit (17), and by the fact that the said programmable data management unit (17) is programmed to select, as the set value ($P_c$) in the lookup table, the set value corresponding to the said identification data item and to the said at least one supplementary item of information entered by means of the keyboard (30).

17. Device according to any one of claims 12 to 16, characterised by the fact that it comprises, by way of the said means for measuring the value of the pressure of the air inside the tyre (5), a first pressure sensor (35) that is situated in the inflation machine (2) and that is in communication, from the fluid point of view, with the said tyre (5) when the inflation machine is connected to an inflation valve (10) of the wheel (3).

18. Device according to claims 17, characterised by the fact that the programmable data management unit (17) is programmed so as to compare the pressure values supplied by the first and second pressure sensors (35, 16) and to produce and count an error signal if the said pressure values differ by more than a predefined quantity.

19. Device according to claim 18, characterised by the fact that the programmable data management unit (17) is programmed so as to send an error message if the number of error signals counted in the course of successive inflation operations reaches a predefined number and to put the inflation machine (2) out of service.

20. Device according to any one of claims 12 to 17, characterised in that it comprises, by way of the said means for measuring the value of the pressure of the air inside the tyre (5), a second pressure sensor (16) that is carried by the said information medium (7, 8 or 9), and by the fact that the said information medium is able to supply, when it is consulted, the value of the pressure measured by the second pressure sensor (16) to the said programmable data management unit (17).

21. Device according to any one of claims 12 to 19, characterised in that it comprises a third pressure sensor (38) installed so as to measure the atmospheric pressure on the site of the inflation machine (2), and by the fact that the programmable data management unit (17) is programmed so as to calculate the corrected set value $P'_{cc}$, in relative value, according to the formula:

$$P'_{cc} = (P'_c + P_{atm}) \cdot [(t_p + 273)/(t_{ref} + 273)] - P_{atm}$$

in which $P'_c$ is the said set value, in relative value, for the inflation pressure, $P_{atm}$ is the value of the atmospheric pressure measured by the third pressure sensor (38), and $T_p$ and $T_{ref}$ are respectively the said temperature of the tyre and the said variable reference temperature in degrees C.

22. Inflation machine for vehicle wheels having at least one component (4, 5 or 6) that is provided with an information medium (7, 8 or 9) carrying a first temperature sensor (20) able to supply a value of a temperature of a tyre (5) on a corresponding wheel (3), the said information medium (7, 8 or 9) being automatically consultable and able to supply, when it is consulted, at least one data item ($T_p$) that can be used for inflating the tyre, the said machine (2) comprising:

a) a consultation and transmission means (19) able to automatically consult the said information medium (7, 8 or 9) and to automatically transmit the said at least one data item to a programmable data management unit (17), b) the said programmable data management unit (17), c) a second temperature sensor (27) for measuring an ambient temperature on the site of the inflation machine (2), d) calculation means included in the said programmable data management unit (17) for calculating a corrected set value ($P_{cc}$) for an inflation pressure of the tyre (5) to be inflated, on the basis of a set value ($P_c$) for the inflation pressure defined from at least one data item supplied to the said programmable data management unit (17), and taking account of the value of the temperature ($T_p$) of the tyre supplied by the first temperature sensor (20), the programmable data management unit (17) being programmed so that the said calculation means calculate an average value of the said ambient temperature over a predefined elapsed time period, and calculate the corrected set value $P_{cc}$ according to the formula:

$$P_{cc} = P_c \cdot \frac{T_p}{T_{ref}}$$

in which $P_c$ is the said set value for the inflation pressure, $T_p$ is the temperature of the tyre (5) supplied by the first temperature sensor (20) and $T_{ref}$ is a variable reference temperature that is chosen as being a lowest temperature from amongst the ambient temperature measured on the site of the inflation machine (2) by the second temperature sensor (37) and the said calculated average value of the ambient temperature, the pressures $P_c$ and $P_{cc}$ being in absolute value and the temperatures $T_p$ and $T_{ref}$ being in degrees K, e) a pressure sensor (35) able to measure a value of a pressure of the air inside the said tyre (5) to be inflated and for supplying the value of the measured pressure to the said programmable data management unit (17), f) inflation means (24-29) controlled by the said programmable data management unit (17) for adjusting the value of the pressure of the air inside the tyre (5) to the corrected set value ($P_{cc}$) calculated by the said calculation means.

23. Inflation machine according to claim 22, characterised by the fact that the programmable data management unit (17) comprises a memory (18) containing a lookup table comprising the identification data of all the tyres liable to be inflated by means of the inflation machine (2) and, for each identification data item, several set values for the inflation pressure that themselves depend on at least one supplementary item of information chosen from the group comprising information indicating the model of the vehicle (V) to which the wheel (3) whose tyre (5) is to be inflated belongs, information indicating whether the said tyre (5) belongs to a front or rear axle, information indicating a state of loading of the vehicle (V) and information indicating on which type of road the user has the intention of travelling.

24. Inflation machine according to claim 23, characterised by a keyboard (30) for entering the said at least one supplementary item of information in the said programmable data management unit (17), and by the fact that the said programmable data management unit (17) is programmed to select, as the set value ($P_c$) in the lookup table, the set value corresponding to the said identification data item and to the said at least one supplementary item of information entered by means of the keyboard (30).

25. Inflation machine according to any one of claims 22 to 24, characterised by the fact that it comprises, by way of the said means for measuring the value of the pressure of the air inside the tyre (5), a first pressure sensor (35) that is situated in the inflation machine (2) and that is in communication, from the fluid point of view, with the said tyre when the inflation machine is connected to an inflation valve (10) of the wheel (3).

26. Inflation machine according to claim 25, characterised by the fact that the programmable data management unit (17) is programmed so as to compare the pressure values supplied by the first and second pressure sensors (35, 16) and to produce and count an error signal if the said pressure values differ by more than a predefined quantity.

27. Inflation machine according to claim 26, characterised by the fact that the programmable data management unit (17) is programmed so as to send an error message if the number of error signals counted in the course of successive inflation operations reaches a predefined number and to put the inflation machine (2) out of service.

28. Inflation machine according to any one of claims 22 to 27, characterised by the fact that it comprises a third pressure sensor (38) installed so as to measure the atmospheric pressure on the site of the inflation machine (2), and by the fact that the programmable data management unit (17) is programmed so as to calculate the corrected set value $P'_{cc}$, in relative value, according to the formula:

$$P'_{cc} = (P'_c + P_{atm}) \cdot [(t_p + 273)/(t_{ref} + 273)] - P_{atm}$$

in which $P'_c$ is the said set value, in relative value, for the inflation pressure, $P_{atm}$ is the value of the atmospheric pressure measured by the third pressure sensor (38), $T_p$ and $T_{ref}$ are respectively the said temperature of the tyre and the said variable reference temperature in degrees C.

* * * * *